United States Patent Office 3,458,028
Patented July 29, 1969

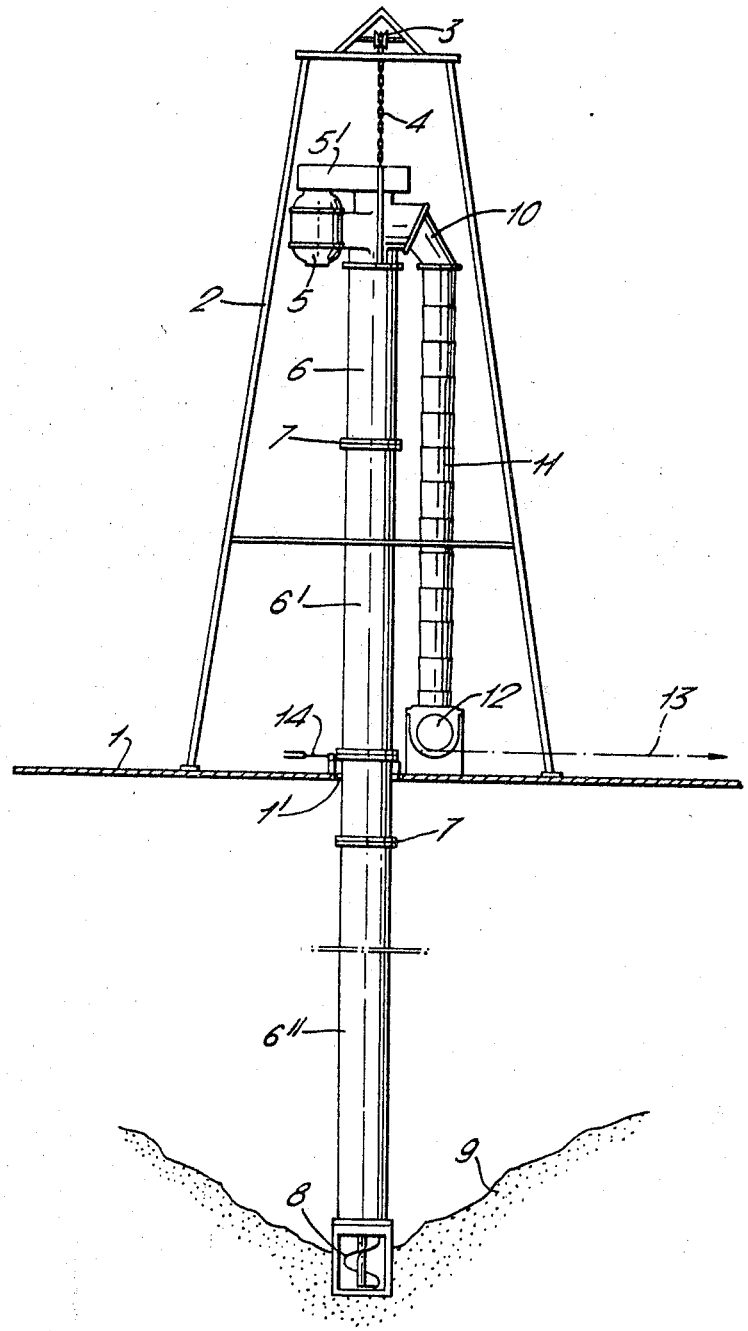

3,458,028
ARRANGEMENT FOR UNLOADING
OF BULK CARGO
Alf Tidemand-Johannessen, Wildenveybakken 3,
Oslo, Norway
Filed May 16, 1967, Ser. No. 638,973
Claims priority, application Norway, May 16, 1966,
163,041
Int. Cl. B65g 33/14, 63/06, 65/22
U.S. Cl. 198—213                                    1 Claim

ABSTRACT OF THE DISCLOSURE

Apparatus for unloading grain from a ship in which a screw conveyor constituted of a plurality of detachably connected sections is supported from a dismountable scaffold on the deck of the ship such that the screw conveyor passes through an access opening in the deck and can be raised and lowered. A telescopic conveyor is connected to the top of the screw conveyor for receiving grain therefrom and for conveying the grain away, while a clamping device is provided in the region of the access opening in the deck to clamp the screw conveyor and enable addition or removal of a section from the portion of the screw conveyor extending thereabove.

---

The present invention relates to an arrangement for the discharge of bulk cargo, preferably grain, from a ship which is not provided with hatchways, as for example tankers.

For the unloading of ships having the usual hatchways in the deck a series of different unloading arrangements are known. For such cargo, as for instance grain, it is customary to carry out the discharge by means of silo plants, the grain being sucked up from the hold through convenient tubes.

For a ship which is not provided with such usual hatchways there is small possibility of using ordinary unloading gear. This is especially the case when grain loaded ships discharge their cargo in ports without docks, cranes, silos or the like. In such cases the ship often will have to unload in the road and the discharge must be carried out by the ship's own facilities. It is in such situations that the present invention is applied. This is particularly true where grain shipments are made to the so called underdeveloped countries, where ships must be able to deliver the grain cargo by its own discharge means and where often tankers are used for such shipments.

To solve the problem thus under consideration there is proposed according to the invention, a device for discharge of bulk cargo from ships without hatchways, as for instance tankers, which are provided only with a convenient number of access openings in the deck, the proposed device consisting of a screw conveyor which can be led down through such deck openings and which is constituted by a convenient number of sections and at its upper end is suspended from a scaffold or the like rigged over the access opening and provided with drive means for the screw conveyor and means for successively to be lowered as the unloading proceeds, and means at the upper end of the scaffold for transporting the grain brought up by the screw to further means for conveyance to a convenient feed out place.

The above and further features of the invention will be better understood from the following description, reference being had to an embodiment according to the invention diagrammatically shown in the sole figure of the attached drawing.

In the drawing 1 is a ship's deck in which there is an access opening 1', for example, a manhole in the deck; above said openings 1', there is rigged a scaffold 2 which at its upper end is provided with suspension means for a vertical screw conveyor which is led down through the opening 1' to the grain cargo 9. The suspension in the example shown is a chain 4 which by a convenient winch arrangement 3 makes it possible to raise or lower the screw conveyor.

The screw conveyor itself consists of a number of tube sections 6, 6', 6" etc. which by flange connections 7 can be coaxially joined together to provide the desired length. Each section thus comprises a convenient tube length within which is journaled a conveyor screw the ends of which by the joining of the tube sections automatically mesh with the correspondingly formed end of the adjacent tube section. Thereby the screw conveyor at any time can be adapted as to length for the particular unloading conditions.

In the upper end of the screw conveyor there is a drive motor 5 which via a convenient gear transmission 5' drives the screw 8 extending through the sections 6, 6', 6" etc. The lower end of the lower section 6" is provided with a part where the screw is exposed to be able to lead the grain 9 into the tube sections for displacement up to the upper end of the screw conveyor. The upper end is provided with a branch tube 10 which in the example shown has a telescopic tube connection 11 whereby the grain can be fed to a convenient discharge location 12 at the deck 1. From here the grain can be transported by a belt conveyor 13 over the ship's side for discharge into lighter barges or warehouses.

As the level of the grain 9 in the hold below the deck 1 lowers during the discharge, the screw conveyor is lowered by means of the suspension means 3, 4. The tubes 11 thereby due to their telescopic arrangement automatically at any time will adapt themselve to the proper length, so that the unobstructed flow of grain can pass from the upper end of the conveyor down to the deck and further to the discharge location.

To support the sections of the conveyor when one of them is removed or an intermediate section is inserted, there is arranged at the deck opening 1' a clamping means which is diagrammatically shown at 14. Thereby the upper end of the sections located below the deck 1 can be supported, while a section is removed or is inserted in that part of the screw conveyor which is situated between the deck and the drive arrangement 5.

From the above it will be seen that according to the invention there is provided simple means whereby a tanker loaded with grain can be unloaded. The necessary unloading apparatus is constituted by engageable sections, and in dismounted condition the conveyor as well as its supporting scaffold can be stored in a minimum of space.

What is claimed is:
1. Apparatus for unloading grain from a ship via an access opening in the deck thereof, said apparatus comprising a screw conveyor constituted by a plurality of assembled sections detachably connected in endwise engagement, said screw conveyor extending through the access opening in the deck to the grain stored therebeneath for upwardly transporting the grain, scaffold means on said deck surrounding said access opening and that portion of the screw conveyor extending above the deck, said scaffold means being disconnectable from said deck and being constructed to be dismantled, means on said scaffold means for supporting the screw conveyor at the top thereof such that the screw conveyor can be raised and lowered, said screw conveyor being lowered into the grain as the level thereof drops upon removal of grain, conveyor means connected to said screw conveyor at the top thereof for receiving the grain from the screw conveyor and for conveying the grain away therefrom, said conveyor means being telescopic to follow the raising and lowering of the screw conveyor, and clamping means on said deck at said access opening for selectively engaging that section of the screw conveyor positioned at said opening to hold the same fixed while an additional section is added or removed from the portion of the screw conveyor located above the access opening.

References Cited

UNITED STATES PATENTS

| | | | |
|---|---|---|---|
| 607,255 | 7/1898 | Marangos | 198—126 |
| 1,252,425 | 1/1918 | Gannaway | 198—126 X |
| 2,558,006 | 6/1951 | Shriver | 198—213 X |
| 2,772,764 | 12/1956 | McClellan | 198—213 X |

EDWARD A. SROKA, Primary Examiner

U.S. Cl. X.R.

214—15